United States Patent [19]

Sputhe

[11] Patent Number: 5,072,697

[45] Date of Patent: Dec. 17, 1991

[54] SEALING APPARATUS FOR AN INTERNAL COMBUSTION ENGINE

[76] Inventor: Alan C. Sputhe, 11185 Lime Kiln Rd., Grass Valley, Calif. 95949

[21] Appl. No.: 668,622

[22] Filed: Mar. 13, 1991

[51] Int. Cl.⁵ ............................................. F02F 1/06
[52] U.S. Cl. ........................... 123/41.69; 123/193 CH; 277/235 B
[58] Field of Search ............. 123/41.42, 41.69, 41.72, 123/41.74, 41.84, 193 CH, 196 R; 277/235 R, 235 A, 235 B

[56] References Cited

U.S. PATENT DOCUMENTS

| | | | |
|---|---|---|---|
| 1,972,814 | 9/1934 | Anderson | 123/41.74 |
| 2,358,228 | 9/1944 | Hoof | 137/516.25 |
| 3,209,659 | 10/1965 | Colwell | 92/171 |
| 3,363,608 | 1/1968 | Scherenberg et al. | 123/193 CH |
| 3,765,385 | 10/1973 | Conrad | 123/193 CH |
| 3,843,141 | 10/1974 | Kuhn | 123/193 CH |
| 4,462,343 | 7/1984 | Eckert | 123/41.69 |
| 4,513,703 | 4/1985 | Eckert | 123/193 CH |
| 4,638,769 | 1/1987 | Ballheimer | 123/41.84 |
| 4,791,891 | 12/1988 | Kubis et al. | 123/41.84 |
| 4,836,158 | 6/1989 | Panzica | 123/193 CH |

FOREIGN PATENT DOCUMENTS

| | | | |
|---|---|---|---|
| 122377 | 10/1946 | Australia. | |
| 1495481 | 7/1984 | U.S.S.R. | 277/235 B |

OTHER PUBLICATIONS

PCT International Application WO 89/03520, Thomas et al., dated Apr. 20, 1989.

*Primary Examiner*—Noah P. Kamen
*Attorney, Agent, or Firm*—David Weiss

[57] ABSTRACT

A cylinder block of an internal combustion engine, and in particular of a Harley-Davidson motorcycle engine, including improved sealing between the block and a secured cylinder head, and which is interchangeable with an original-equipment block. A nipple communicating with a fluid passage in the block protrudes from the block's top surface for being received by a fluid passage bore in the cylinder block head when the block end head are assembled, and sealing means is carried by the nipple for being received by and sealingly seating against the fluid passage bore in the head. The compression gasses from the cylinder bore are sealed off by a malleable annulus retained on the block's top surface about the cylinder bore and compressed between such surface and the head's bottom surface when the block is secured to the head.

29 Claims, 2 Drawing Sheets

U.S. Patent     Dec. 17, 1991     Sheet 1 of 2     5,072,697
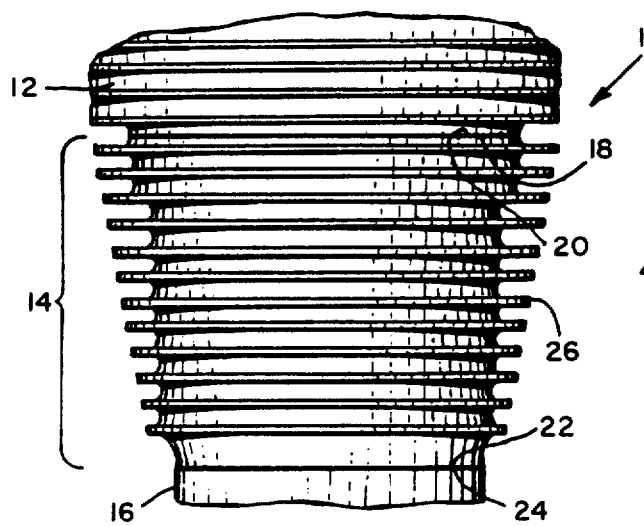
Fig. 1.
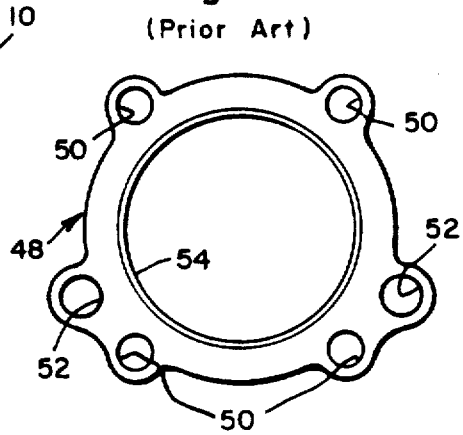
Fig. 4. (Prior Art)
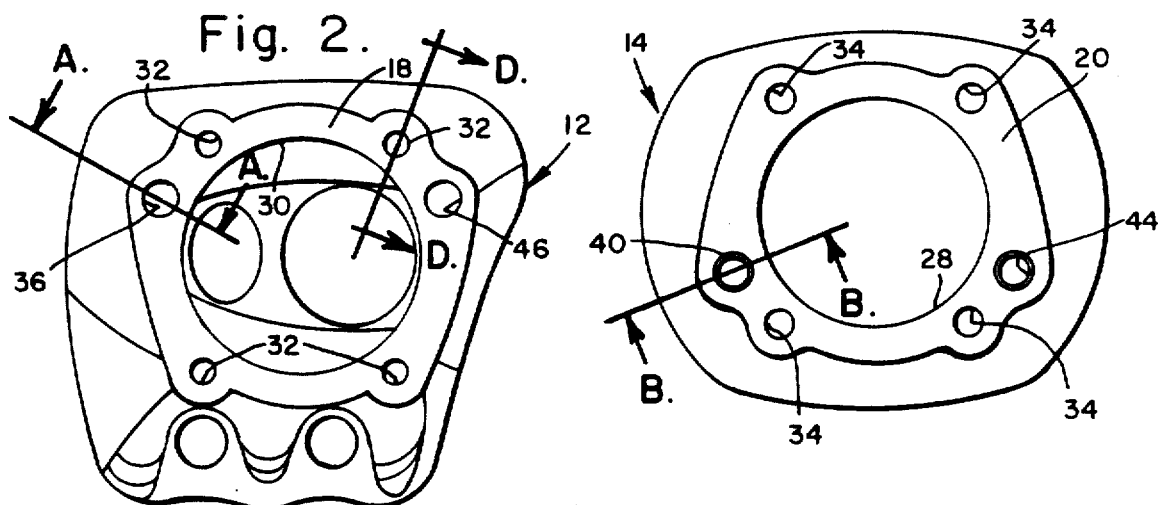
Fig. 2.
Fig. 3. (Prior Art)
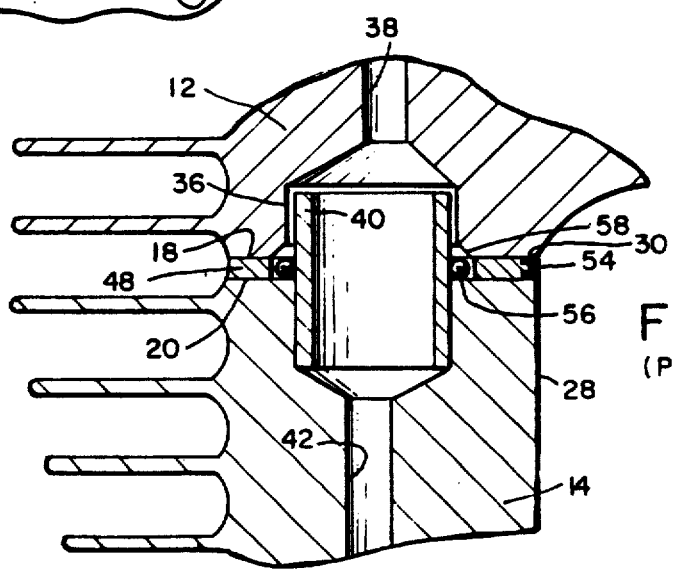
Fig. 5. (Prior Art)

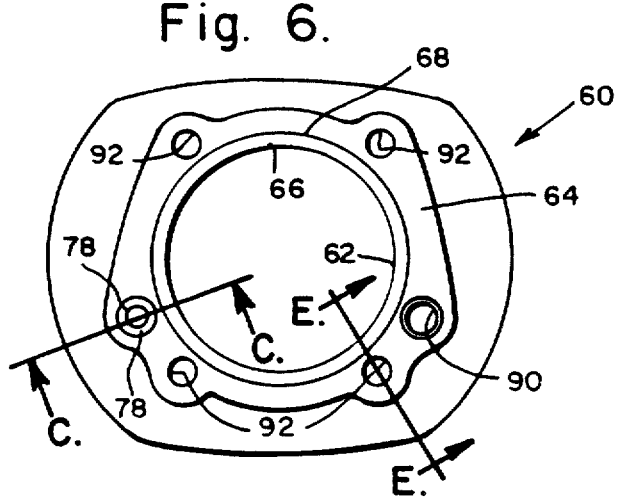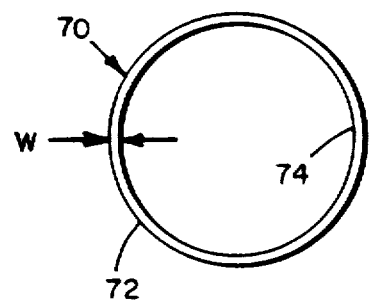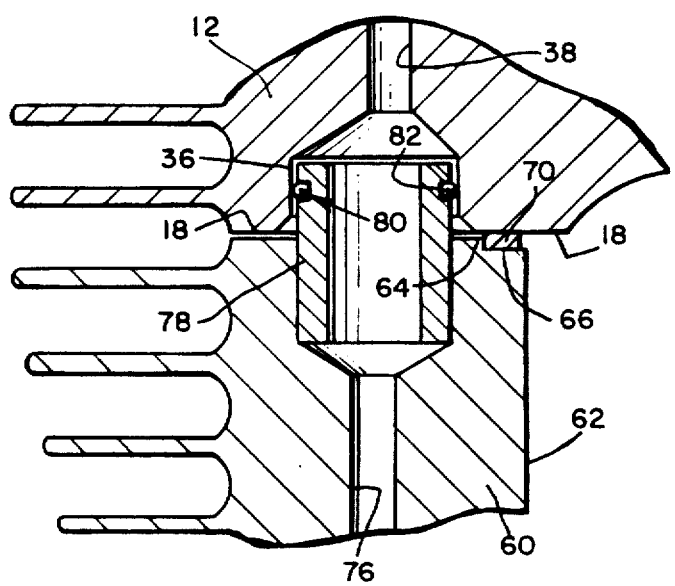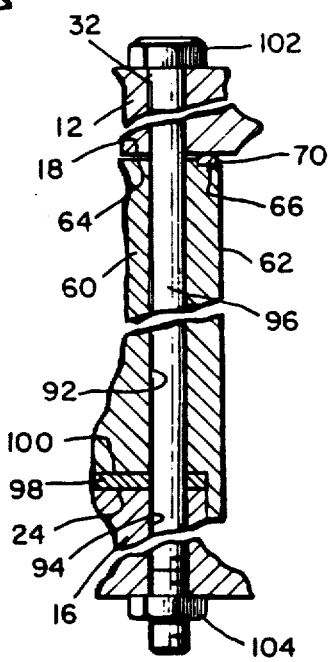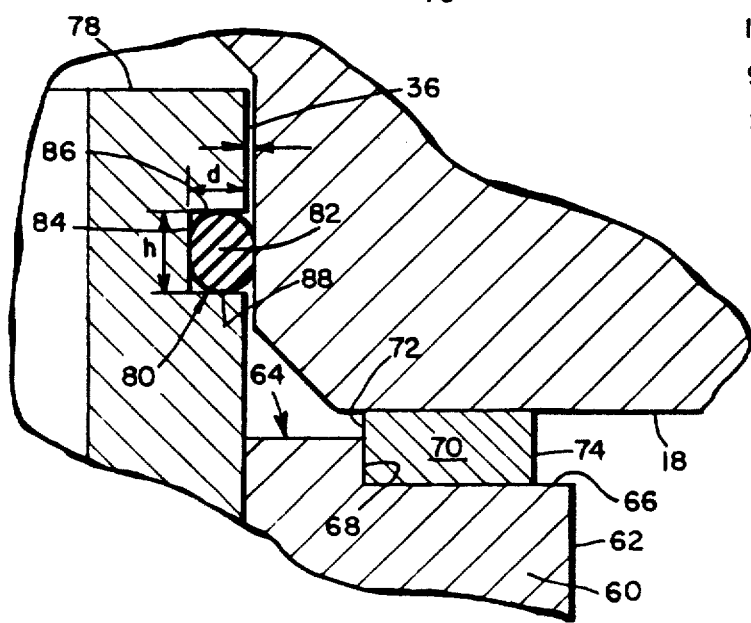

SEALING APPARATUS FOR AN INTERNAL COMBUSTION ENGINE

BACKGROUND OF THE INVENTION

This invention relates to internal combustion engines, and more particularly to improved sealing apparatus between a cylinder block and a cylinder head of a motorcycle engine.

As is well known, internal combustion engines such as motorcycle engines include a cylinder block having a combustion chamber bore (generally referred to as a cylinder bore) intermediate a cylinder head and a crankcase, with sealing gaskets being provided at the interfaces between the head and block and between the block and case. In particular, a gasket is conventionally provided between the block and the head (generally referred to as a "head gasket") of a Harley-Davidson motorcycle engine for sealing the combustion chamber compression gasses from leakage at the interface of the bottom end surface of the head and the top end surface of the block. The head gasket additionally seals against fluid leakage at the head/block interface, from fluid passages in the head and in the block communicating between the head and block. One such fluid passage in a Harley-Davidson motorcycle engine is for returning oil from the head through the block and to the crankcase.

One type of head gasket for a Harley-Davidson motorcycle engine is described in U.S. Pat. No. 4,836,158, to Ignatius J. Panzica, which patent is incorporated herein by reference. The head gasket therein disclosed is intended as an improved replacement for the original-equipment Harley-Davidson head gasket which is later described herein.

In situations where it may be desired to modify the motorcycle block, such as by enlarging the cylinder bore to accommodate a piston of increased diameter, prior art head gasket configurations with dimensional modifications are generally used. However, there exists a need to provide more effective sealing at the head/block interface than is provided by modified prior art head gaskets in such situation.

SUMMARY OF THE INVENTION

The apparatus provided by the present invention includes an improved sealing arrangement at the interface of an internal combustion engine's cylinder head and cylinder block, for sealing the compression gasses from the cylinder bore at the interface and for independently sealing fluid passage connections at the interface. The sealing arrangement is particularly adaptable to motorcycle engines and specifically to a Harley-Davidson motorcycle engine, for sealing the compression gasses and the oil return line at the head/block interface. Although the improved sealing arrangement of the present invention may be provided as original equipment by the motorcycle engine manufacturer, the invention finds after-market application such as when a replacement cylinder block includes a cylinder bore of greater diameter than the cylinder bore of the original-equipment block yet is capable of mating with the original-equipment cylinder head.

Briefly described, the apparatus of the present invention comprises, in an internal combustion engine, a cylinder block having an end surface and a cylinder bore; a cylinder head having an end surface facing the block end surface; annular gasket means about the cylinder bore and between the end surfaces; means securing the block and the head with the gasket means compressed by the end surfaces; a fluid passage in the head end surface; a fluid passage in the block; a nipple communicating with the block fluid passage, the nipple protruding from the block end surface and received by the fluid passage bore in the head; and sealing means carried by the nipple, the sealing means received by and sealingly seating against the fluid passage bore in the head. The nipple includes an annular groove thereabout; and the sealing means, which is preferably a resilient O-ring, is retained by the nipple annular groove. The nipple's annular groove and the retained O-ring are preferably spaced from the block end surface and are received by the fluid passage bore in the head. The gasket means is preferably a malleable annulus, such as a flat metal annulus, and the block end surface includes a stepped-down annular land about the cylinder bore and retaining the metal annulus.

The apparatus further includes a crank-case sealingly secured to the block, and the joined fluid passages comprise an oil return passage for returning oil from the head through the block and to the crank-case.

For particular application in the after-sale market, a cylinder block may be provided which is interchangeable with an original-equipment cylinder block, and which may be utilized for replacing the original-equipment block. The replacement block includes modifications, when compared with the original-equipment block, for including the sealing arrangement of the present invention. The replacement block may be further modified, such as by having a cylinder bore of greater diameter than the bore of the original-equipment block. The replacement block is intended for combination with an original-equipment cylinder head (or with an after-market head which is interchangeable with an original-equipment head) of an internal combustion engine, and in particular for combination with an original-equipment (or interchangeable after-market) cylinder head of a Harley-Davidson motorcycle engine.

Accordingly, the present invention provides cylinder block apparatus for combination with a cylinder head of an internal combustion engine, and in particular a motorcycle engine, the head having an end surface and a fluid passage including a fluid passage bore extending to the head end surface, the cylinder block apparatus comprising: a cylinder block having a cylinder bore and an end surface for facing the cylinder head end surface; gasket means for sealing about the cylinder bore at the block end surface and the head end surface when the block is secured to the head with the block end surface facing the head end surface; a fluid passage in the block; a nipple communicating with the block fluid passage and protruding from the block end surface for being received by the fluid passage bore in the head when the block is secured to the head; and sealing means carried by the nipple for being received by and sealingly seating against the fluid passage bore in the head when the nipple is received by the fluid passage bore in the head. The nipple includes an annular groove preferably spaced from the block end surface; and the sealing means, which is preferably a resilient O-ring with a body or cross-sectional diameter greater than the depth of the groove, is retained by the nipple annular groove for being received by the head fluid passage bore for seating thereagainst. The gasket means is a malleable metal annulus, preferably copper; and the block end surface includes a stepped-down annular land about the cylinder bore and retaining the metal annulus about the cylinder bore, the land being stepped-down a distance less than the height of the metal annulus.

A feature of the present invention provides fluid passage sealing apparatus for use in an internal combustion engine, and in particular a motorcycle engine such as a Harley-Davidson motorcycle engine including a cylinder head having an end surface and a fluid passage including a fluid passage bore extending to the head end surface, the engine further including a cylinder block having an end surface facing the head end surface and a fluid passage in the block, the fluid passage sealing apparatus comprising: a nipple protruding from the block end surface and communicating with the fluid passage in the block, for being received by the fluid passage bore in the head; and sealing means carried by the nipple for sealingly seating against the fluid passage bore in the head when the nipple and the carried sealing means are received by the fluid passage bore. The nipple includes an annular groove thereabout preferably spaced from the block end surface; and the sealing means, which is preferably a resilient O-ring, is retained by the nipple annular groove for being received by the head fluid passage bore for seating thereagainst.

BRIEF DESCRIPTION OF THE DRAWINGS

The novel features which are believed to be characteristic of the invention, together with further advantages thereof, will be better understood from the following description considered in connection with the accompanying drawings in which a preferred embodiment of the invention is illustrated by way of example, and where like reference numerals are utilized to indicate like components. It is to be expressly understood, however, that the drawings are for the purpose of illustration and description only, and are not intended as a definition of the limits of the invention.

FIG. 1 is a fragmentary front elevation view of a cylinder head/block/crank-case assembly of an internal combustion motorcycle engine of a type manufactured by Harley-Davidson, Inc.;

FIG. 2 is a bottom plan view of the cylinder head of FIG. 1;

FIG. 3 is a top plan view of the cylinder block as indicated in FIG. 1 and being representative of an original-equipment block manufactured by Harley-Davidson Motor Co., Inc.;

FIG. 4 is a top plan view of a prior art head gasket conventionally provided for use with a Harley-Davidson head and block of FIGS. 2 and 3;

FIG. 5 is a fragmentary elevation cross-sectional view of the assembled cylinder head of FIG. 2 and the cylinder block of FIG. 3 as indicated in FIG. 1, the view of FIG. 5 for reference purposes being considered as taken along the line A—A of FIG. 2 and the line B—B of FIG. 3 in the direction of the appended arrows;

FIG. 6 is a top plan view of a cylinder head in accordance with the present invention for substitution in the assembly of FIG. 1;

FIG. 7 is a plan view of an annular gasket which is a component of the present invention;

FIG. 8 is a fragmentary elevation cross-sectional view of the assembled cylinder head of FIG. 2 and the cylinder block of FIG. 6 as substituted in FIG. 1, the view of FIG. 8 for reference purposes being considered as taken along the line A—A of FIG. 2 and the line C—C of FIG. 6 in the direction of the appended arrows;

FIG. 9 is a fragment of FIG. 8 enlarged for clarity, showing the sealing arrangement of the present invention in greater detail; and FIG. 10 is a fragmentary elevation cross-sectional view of the assembly of FIG. 1 with the cylinder block of FIG. 6 substituted therein, FIG. 10 being illustrative of the manner by which the cylinder block of FIG. 6 is secured to the cylinder head of FIG. 2 and to the crank-case as assembled, the view of FIG. 10 for reference purposes being considered as taken along the line D—D of FIG. 2 and the line E—E of FIG. 6 in the direction of the appended arrows.

DESCRIPTION OF THE PREFERRED EMBODIMENT

As viewed in FIG. 1, a Harley-Davidson internal combustion motorcycle engine includes an upper cylinder head 12, an intermediate cylinder block 14 and a lower crank-case 16. The cylinder head 12 includes a flat, generally downwardly-facing end or bottom surface 18 (see also FIG. 2) which faces a flat, generally upwardly-facing end or top surface 20 of the block 14 (see also FIG. 3). The head 12 and block 14 are secured to one another at the head bottom surface 18 and the block top surface 20, with a head gasket between and compressed by the end surfaces 18, 20, by securing means which shall be described later. Similarly, the crank-case 16 is secured to the block 14 at a generally upwardly-facing crank-case surface 22 and a mating generally downwardly-facing block surface 24 with a case gasket between and compressed by the case surface 22 and the block surface 24. The block 14 and head 12 include exterior cooling fins 26.

As is well known, the block 14 includes a cylinder bore 28, shown in FIGS. 3 and 5, extending to the head 12 when the head is secured to the block 14, including a combustion chamber where compression gasses are produced. The flat top end surface 20 of the cylinder block 14 is perpendicular to and surrounds the cylinder bore 28, and the flat bottom end surface 18 of the cylinder head 12 surrounds the opening 30 in the head 12 (see FIG. 2) included by the combustion chamber when the head 12 and the block 14 are assembled, as shown in FIG. 5.

The head 12 includes a plurality of bolt holes 32 extending therethrough, which are respectively aligned with a like plurality of bolt holes 34 extending through the block 14 when the head and block are assemble. The head 12 further includes a fluid passage bore 36 perpendicularly extending to the bottom surface 18 and communicating with a fluid passage 38 in the head 12, while the block 14 includes a circular nipple 40 perpendicularly protruding from the block top surface 20 and communicating with a fluid passage 42 extending through the block 14. The fluid passage bore 36 and nipple 40 are arranged such that the nipple 40 is received by and closely fits into the bore 36 when the head 12 and the block 14 are assembled, for joining the fluid passages 38, 42 to comprise an oil return passage or line from the head 12 through the block 14 to the case 16, for returning oil from the head 12 to the case 16. The nipple 40 is a metal tube of 1/16 inch wall thickness.

An alignment dowel 44, which is a tube similar to the nipple 40, perpendicularly protrudes from the block top surface 20 (FIG. 3), for being received by an alignment bore 46 in the head 12 perpendicularly extending to the bottom surface 18 of the head 12 (FIG. 2) in similar manner as the block fluid passage nipple 40 is received by the head fluid passage bore 36. During assembly of the head 12 to the block 14, the block and head will be properly aligned when their respective end surfaces 20, 18 are positioned facing one another with the fluid passage nipple 40 received by the fluid passage bore 36 (the fluid passage nipple 40 and bore 36 also serving an alignment function) and the alignment dowel 44 received by the alignment bore 46. As previously indicated, the respective bolt holes 32, 34 will be aligned as well.

It may be appreciated that the alignment dowel 44 may be replaced by a second fluid passage nipple communicating with a second fluid passage in the block 14, and the alignment bore 46 may communicate with a second fluid passage in the head 12, while at the same time serving their alignment function. Such second fluid passages when joined may, for example, provide for circulation of cooling fluid or for air pressure equalization.

The Harley-Davidson original-equipment head gasket 48, shown in FIG. 4, is configured to be alignedly interposed between substantially the entire head bottom surface 18 and substantially the entire block top surface 20 when facing each other, and accordingly the head gasket 48 includes appropriately located bolt apertures 50 for being respectively aligned with the head and block bolt holes 32, 34, and further includes nipple apertures 52 for respectively receiving the fluid passage nipple 40 and the alignment dowel 44 protruding from the block surface 20. The flexible head gasket 48 is conventionally constructed of a substantially non-metallic material, and includes a metal overlayer or clad 54 about and surrounding the non-metallic gasket's inner periphery. An alternative prior art head gasket disclosed in the previously referred to U.S. Pat. No. 4,836,158 appears to be identical in configuration to the Harley-Davidson head gasket 48, except that the metal clad 54 is replaced by a separate malleable metal annulus with its outer periphery contacting the inner periphery of the gasket's non-metallic portion.

Returning to FIG. 5, the Harley-Davidson head gasket 48 is shown in position interposed between the head's bottom end surface 18 and the block's top end surface 20 in the vicinity of the fluid passage nipple 40 received by the fluid passage bore 36. When so assembled, the head 12 is secured to the block 14 such that the head gasket 48 is compressed to form a seal at the cylinder bore 28 for sealing off the compression gasses, as well as at the head/block junction of the fluid passages 38, 42. It is noted that Harley-Davidson provides a resilient O-ring 56 about the nipple 40 and in contact with the block's top end surface 20, and which is situated within the gasket aperture 52 having a diameter slightly greater than the outside diameter of the O-ring 56. The head fluid passage bore 36 is surrounded by a champfer 58 at the head bottom surface 18, and it does not appear that the champfer 58 contacts the O-ring 56 for causing the O-ring 56 to seal against fluid leakage from the fluid passage 38, although such sealing may be possible if the gasket 48 is sufficiently compressed. However, it appears that the fluid passage seal is provided by the gasket 48 being compressed between the head bottom surface 18 and the block top surface 20 surrounding the oil passage nipple 40, as discussed in U.S. Pat. No. 4,836,158 with respect to the head gasket disclosed therein.

Turning to FIGS. 6, 8 and 9 there is shown a cylinder block 60 with the improved sealing arrangement of the present invention. The block 60 may be a replacement block for the original-equipment Harley-Davidson cylinder block 14, modified however for including the sealing arrangement of the present invention such that it mates with the unmodified original-equipment Harley-Davidson cylinder head 12 for being secured thereto as illustrated in FIG. 1. The replacement block shown in FIGS. 6, 8 and 9 has been further modified, when compared with the original-equipment Harley-Davidson block 14, by having a cylinder bore 62 of greater diameter than the cylinder bore 28 of the original-equipment block 14 (see FIGS. 3 and 5). For example, whereas the original-equipment block 14 may include a cylinder bore 28 of between approximately 3 and 3½ inches in diameter, one example of the replacement block 60 included a cylinder bore 62 which was approximately 3.780 inches in diameter.

The cylinder block 60 of the present invention includes a generally upwardly-facing end or top surface 14 which is similar to the top surface 20 of the block 14 previously described, except that the block top surface 64 includes a flat, generally upwardly-facing annular land 66 outwardly extending from the cylinder bore 62 and stepped down from the remainder of the block top surface 64 by a riser or wall 68 concentric with the cylinder bore 62.

When the block 60 and the head 12 are assembled, as illustrated in FIGS. 8 and 9, an annular sealing gasket 70 (see also FIG. 7) is retained on the annular land 66 of the block's top end surface 64. The annular gasket 70 is preferably in the configuration of a flat washer, and its outer periphery or circumference 72 contacts and is retained against the wall 68 while its inner periphery or circumference 74 is concentric with but does not extend into the cylinder bore 62; preferably, the width w of the annular sealing gasket 70 is less than the width of the annular land 66 (i.e. the annular land's distance between the cylinder bore 62 and the wall 68). In one example where the diameter of the cylinder bore 62 was approximately 3.780 inches, the width of the annular land 66 was approximately 0.160 inch and the width w of the annular gasket 70 was approximately 0.120 inch.

The annular sealing gasket 70 is constructed of a malleable material, such as metal and preferably copper. The thickness of the metal annulus 70 (i.e. its height as viewed in FIG. 9) is greater than the height of the wall 68. When the block 60 is secured to the head 12 with the block top end surface 64 (including the stepped-down annular land 66) facing the head bottom end surface 18, the metal annulus 70 is compressed between the surfaces 18, 66 to form a seal about the cylinder bore 62 for sealing off the compression gasses. In the example described in the preceding paragraph, the height of the metal annulus was approximately 0.062 inch and compressed to approximately 0.060 inch when installed between and compressed by the surfaces 66, 18, while the height of the retaining wall 68 was approximately 0.030 inch.

By describing the sealing gasket 70 as being interposed or situated or compressed between the head end surface 18 and the block end surface 64, it is not meant that the gasket 70 must be in contact with substantially the entire head end surface 18 or substantially the entire block surface 64. As shown in FIGS. 8 and 9, the sealing gasket or annulus 70 is preferably in contact only with the head end surface 18 and the block end surface 64 in the vicinity of and about the cylinder bore 62. In fact, the metal annulus 70 contacts the upwardly facing block surface 64 only upon the annular land portion 66 of the surface 64.

In similar manner to the original-equipment block 14, the block 60 of the present invention includes a fluid passage 76, specifically an oil return passage. A circular nipple 78 protrudes from the top end surface 64 of the block 60 and communicates with the fluid passage 76. In contrast to the original-equipment block 14, however, the nipple 78 of the block 90 includes an annular channel or groove 80 inwardly extending from the outer peripheral surface of the nipple 78, in which is retained a resilient O-ring 82 having a body or cross-sectional diameter greater than the depth d of the groove 80. The nipple 78 is a metal tube having a wall thickness sufficiently great to accommodate the depth of the annular groove 80. The annular groove 80 is spaced from the block top end surface 64 such that when the nipple 78 is received by the head fluid passage bore 36 when the head 12 and block 60 are assembled, the retained O-ring 82 is also received by the head fluid passage bore 36 and seats against the head fluid passage bore 36 for sealing off fluid from the passage 38.

The outside diameter of the nipple 78 is slightly less than the diameter of the head fluid passage bore 36 for providing a close fit when the nipple 78 is received by the fluid passage bore 36 while permitting seating by the retained O-ring 82.

The body or cross-sectional diameter of the O-ring 82 in its uncompressed state (ie, uninstalled) is preferably slightly greater than the height of h of the nipple's annular groove 80, and the inside diameter of the O-ring 82 is preferably equal to or slightly less than the diameter of the groove's inner wall 84 for assuring that the resilient O-ring 82 is retained by the groove 80 when installed. The outside diameter of the retained 0-ring 82 is slightly greater than the distance between the groove inner wall 84 and the fluid passage bore 36 when the block 60 and head 12 are assembled, so that the 0-ring 82 is compressed between the groove inner wall 84 and the fluid passage bore 36 for sealing off fluid from the fluid passage 38. Since the resilient O-ring 82 is further compressed between the groove upper wall 86 and the groove lower wall 88, further sealing is provided.

In the example, the diameter of the fluid passage bore 36 of the original-equipment Harley-Davidson head 12 and the outside diameter of the nipple 78 of the block 60 were each nominally approximately 9/16 inch, with these actual dimensions being such that the space s between the nipple outer periphery and the head fluid passage bore 36 was approximately 0.001 inch. The wall thickness of the nipple annular groove 80 had a depth d of approximately 0.050 inch and a height h of approximately 0.062 inch. A suitable O-ring 82 is preferably of a material having good heat resistance, such as phosphonitrilic fluoroelastomer (e.g. ASTM D1418 Designation PZ). An example of a suitable O-ring 82 was a National V14-75 O-ring having a body or cross-sectional diameter of approximately 0.070 inch and an inner diameter of approximately 0.426 inch.

Similarly to the original-equipment Harley-Davidson block 14 (FIG. 3), the improved block 60 of the present invention (see FIG. 6) includes an alignment dowel 90 protruding from the block top end surface 64 for being received by the alignment bore 46 of the original-equipment head 12 (FIG. 2). During assembly of the head 12 to the block 60, the block and head will be aligned when their respective end surfaces 20, 64 are positioned facing one another with the fluid passage nipple 78 and the retained O-ring 82 received by the fluid passage bore 36 (the fluid passage nipple 78 and bore 36 also serving an alignment function) and the alignment dowel 90 is received by the head's alignment bore 46. Bolt holes 92 (FIG. 6) in the block 60, similarly to the bolt holes 34 of the originalequipment block 14 (FIG. 3), will be respectively aligned as well with the bolt holes 32 of the original-equipment head 12 (FIG. 2).

In the event that the original-equipment head 12 includes a second fluid passage (e.g. for cooling or for air pressure equalization) with the alignment bore 46 communicating with such second fluid passage, it may be appreciated that the alignment dowel 90 of the cylinder block 60 of the present invention may be replaced by a second fluid passage nipple assembly (not shown) similar to the oil return nipple 78 with annular groove 80 and retained O-ring 82 for being received by the alignment bore 46 in the head 12. Such second fluid passage nipple assembly, while serving a fluid sealing function, will at the same time serve the alignment function of the alignment dowel 90.

FIG. 10 illustrates the manner in which the assembled head 12 and block 60 are secured to one another such that their facing end surfaces 18, 64 compress the installed malleable annulus 70 for sealing off the compression gasses from the combustion chamber. When the head 12 and block 60 are assembled, the bolt holes 32 in the head are aligned with respective bolt holes 92 through the block 60. Additionally, the aligned bolt holes 32, 92 are aligned with further bolt holes 94 in the case 16, and bolts 96 are respectively inserted within the aligned holes 32, 92, 94. A case gasket 98 is provided between the upper surface 24 of the case 16 and a generally downwardly-facing lower surface 100 of the block 60. Since the bolt heads 102 are restrained by the cylinder head 14 and the nuts 104 at the bottom of the bolts 96 have been tightened against the case 16, the resulting bolt tension causes the head 14 and the block 60 and the case 16 to be secured as an assembly with the malleable annulus 70 and the case gasket 98 in compression for sealing their respective cooperating surfaces.

Although FIG. 10 illustrates the manner in which the replacement block 60 is secured between the original-equipment Harley-Davidson head 14 and crank-case 16, it should be noted that such manner of securing is employed as well in the original-equipment assembly wherein the original-equipment Harley-Davidson block 14 is secured to the head 12 and the case 16. In such prior art assembly, of course, a prior art head gasket (such as the head gasket 48 of FIG. 4 or the replacement head gasket disclosed in U.S. Pat. No. 4,836,158) would be substituted for the malleable annulus 70 and annular land 66 arrangement shown in FIG. 10, and such prior art head gasket would be situated between and compressed by the end surfaces 20, 18 of the original-equipment block 14 and head 12.

It may be appreciated that the fluid passage seal of the present invention, and in particular the oil return seal, is completed independently of the combustion chamber seal, unlike conventional Harley-Davidson sealing arrangements where the head gasket serves the dual purposes of providing the oil return seal and the combustion chamber seal. The oil return seal of the present invention provides a more effective seal for the oil return, and the copper annulus retained upon its stepped land provides a more effective seal for the compression gasses. The oil return seal of the present invention and its independence from the combustion chamber seal permit the completed fluid passage or oil return line to be physically closer to the combustion chamber/cylinder bore than is possible with prior art head gaskets without compromising the integrity of either compression or oil sealing. Accordingly, the invention provides a cylinder block which is interchangeable with current originalequipment Harley-Davidson cylinder blocks for combination with an original-equipment cylinder head and an original-equipment crank-case, with the replacement or interchangeable block having a cylinder bore of substantially greater diameter than is available with the current original-equipment blocks.

Thus there has been described a cylinder block of an internal combustion engine, and in particular of a Harley Davidson motorcycle engine, having improved sealing between the block and a secured cylinder head, and which is interchangeable with an original-equipment block. It should be noted that the block of the present invention is also interchangeable with after-market cylinder blocks which are themselves interchangeable with the original-equipment blocks, and that the block of the present invention may be installed in combination either with the original-equipment cylinder head and crank-case or with after-market heads and cases which are themselves interchangeable with the original-equipment heads and cases. The cylinder block of the present invention may be further modified, as compared with the original-equipment block or the interchangeable after-market block, such as by having a greater diameter cylinder bore. Other embodiments of the present invention and variations of the embodiment herein presented may be developed without departing from the essential characteristics thereof. Accordingly, the invention should be limited only by the scope of the claims listed below.

I claim:

1. In an internal combustion engine, the combination comprising:
   a cylinder block having an end surface and a cylinder bore;
   a cylinder head having an end surface facing said block end surface;
   gasket means about said cylinder bore and between said end surfaces;
   means securing said block and said head with said gasket means compressed by said end surfaces;
   a fluid passage in said head and including a fluid passage bore extending to said head end surface;
   a fluid passage in said block;
   a nipple communicating with said block fluid passage, said nipple protruding from said block end surface and received by said fluid passage bore in said head; and
   sealing means carried by said nipple, said sealing means received by and sealingly seating against said fluid passage bore in said head.

2. The combination according to claim 1, wherein: said sealing means carried by said nipple is spaced from said block end surface.

3. The combination according to claim 1, wherein: said nipple includes an annular groove thereabout; and said sealing means is retained by said nipple annular groove.

4. The combination according to claim 3, wherein: said nipple annular groove is spaced from said block end surface.

5. The combination according to claim 3, wherein: said sealing means is a resilient O-ring retained by said groove and having a cross-sectional diameter greater than the depth of said groove.

6. The combination according to claim 5, wherein: said retained O-ring is spaced from said block end surface.

7. The combination according to claim 1, further including a crank-case secured to said block, and wherein said fluid passages comprise an oil return passage for returning oil from said head through said block and to said crank-case.

8. The combination according to claim 1, wherein: said gasket means is an annular gasket; and said block end surface includes a stepped-down annular land about said cylinder bore and retaining said annular gasket.

9. The combination according to claim 8, wherein: said land is stepped-down by a distance has than the height of said annular gasket.

10. The combination according to claim 9, wherein: said annular gasket is a malleable annulus.

11. For combination with a cylinder head of an internal combustion engine, the head having an end surface and a fluid passage including a fluid passage bore extending to the head end surface, cylinder block apparatus comprising:
    a cylinder block having a cylinder bore and an end surface for facing the cylinder head end surface;
    gasket means for sealing about said cylinder bore at said block end surface and the head end surface when said block is secured to the head with said block end surface facing the head end surface;
    a fluid passage in said block;
    a nipple communicating with said block fluid passage and protruding from said block end surface for being received by the fluid passage bore in the head when said block is secured to the head; and
    sealing means carried by said nipple for being received by and sealingly seating against the fluid passage bore in the head when said nipple is received by the fluid passage bore in the head.

12. The cylinder block apparatus according to claim 11, wherein said block is for combination with the cylinder head of a motorcycle engine.

13. The cylinder block apparatus according to claim 12, wherein: said sealing means carried by said nipple is spaced from said block end surface.

14. The cylinder block apparatus according to claim 12, wherein: said nipple includes an annular groove thereabout; and said sealing means is retained by said nipple annular groove.

15. The cylinder block apparatus according to claim 14, wherein: said nipple annular groove is spaced from said block end surface.

16. The cylinder block apparatus according to claim 14, wherein: said sealing means is a resilient O-ring retained by said groove and having a cross-sectional diameter greater than the depth of said groove.

17. The cylinder block apparatus according to claim 16, wherein: said retained O-ring is spaced from said block end surface.

18. The cylinder block apparatus according to claim 12, wherein: said gasket means is retained on said block end surface about said cylinder bore.

19. The cylinder block apparatus according to claim 12, wherein:
    said gasket means is an annular gasket; and
    said block end surface includes a stepped-down annular land about said cylinder bore for retaining said annular gasket.

20. The cylinder block apparatus according to claim 19, wherein:
    said land is stepped-down by a distance less than the height of said annular gasket.

21. The cylinder block apparatus according to claim 20, wherein:
    said annular gasket is a malleable annulus.

22. For use in an internal combustion engine including a cylinder head having an end surface and a fluid passage including a fluid passage bore extending to the head end surface, and a cylinder block having an end surface facing the head end surface and a fluid passage in the block, fluid passage sealing apparatus comprising:
    a nipple protruding from the block end surface and communicating with the fluid passage in the block, for being received by the fluid passage bore in the head; and
    sealing means carried by said nipple for being received by and sealingly seating against the fluid passage bore in the head when said nipple is received by the fluid passage bore.

23. The fluid passage sealing apparatus according to claim 22, wherein:
    said sealing means carried by said nipple is spaced from said block end surface.

24. The fluid passage sealing apparatus according to claim 22, wherein:
    said nipple includes an annular groove thereabout; and
    said sealing means is retained by said nipple annular groove.

25. The fluid passage sealing apparatus according to claim 24, wherein:
    said nipple annular groove is spaced from said block end surface.

26. The fluid passage sealing apparatus according to claim 24, wherein:
    said sealing means is a resilient O-ring retained by said groove and having a cross-sectional diameter greater than the depth of said groove.

27. The fluid passage sealing apparatus according to claim 26, wherein:
    said nipple annular groove is spaced from said block end surface.

28. The fluid passage sealing apparatus according to claim 26, wherein:
    said retained O-ring is spaced from said block end surface.

29. The fluid passage sealing apparatus according to claim 26, wherein:
    the height of said annular groove is smaller than the cross-sectional diameter of said O-ring.

* * * * *

UNITED STATES PATENT AND TRADEMARK OFFICE
CERTIFICATE OF CORRECTION

PATENT NO. : 5,072,697
DATED : December 17, 1991
INVENTOR(S) : Alan C. Sputhe

It is certified that error appears in the above—identified patent and that said Letters Patent is hereby corrected as shown below:

Column 6, line 19, first occurence of "14" should be
--64--

Column 7, line 51, --the nipple 78 was nominally approximately 1/8 inch, and-- should be inserted after "thickness of"

Column 10, line 18, "has" should be --less--

Signed and Sealed this

Thirtieth Day of March, 1993

*Attest:*

STEPHEN G. KUNIN

*Attesting Officer*     Acting Commissioner of Patents and Trademarks